United States Patent [19]

Johnssen

[11] Patent Number: 5,645,951
[45] Date of Patent: Jul. 8, 1997

[54] METHOD OF GENERATING ELECTRIC ENERGY FROM BIOLOGICAL RAW MATERIALS

[75] Inventor: Wolf Johnssen, München, Germany

[73] Assignee: Hannelore Binsmaier Nee Gallin-Ast, Erdweg-Grossberghofen, Germany

[21] Appl. No.: 630,884

[22] Filed: Apr. 2, 1996

Related U.S. Application Data

[63] Continuation of Ser. No. 295,356, Aug. 24, 1994, abandoned, which is a continuation of Ser. No. 29,797, Mar. 10, 1993, abandoned.

[30] Foreign Application Priority Data

| | | | |
|---|---|---|---|
| Mar. 13, 1992 | [DE] | Germany | 42 07 975.6 |
| Aug. 20, 1992 | [DE] | Germany | 42 27 485.0 |
| Oct. 16, 1992 | [DE] | Germany | 42 35 017.4 |

[51] Int. Cl.$^6$ .............................. H01M 8/00; H01M 6/00
[52] U.S. Cl. ............................ 429/16; 429/47; 429/50; 429/33; 429/188; 429/193; 429/194; 429/203; 429/204; 429/218
[58] Field of Search ..................... 429/16, 47, 50, 429/33, 188, 193, 194, 203, 204, 218

[56] References Cited

U.S. PATENT DOCUMENTS

| | | | |
|---|---|---|---|
| 4,522,894 | 6/1985 | Hwang et al. | 429/19 |
| 5,141,823 | 8/1992 | Wright et al. | 429/63 |
| 5,198,310 | 3/1993 | Fleming et al. | 429/17 |

*Primary Examiner*—Arun S. Phasge
*Attorney, Agent, or Firm*—Herbert Dubno; Jonathan Myers

[57] ABSTRACT

A method of generating electric energy from biological raw materials. A biological raw material is used which is substantially free from sulfur of natural origin. A combustion gas is generated from biological raw materials in an oxidation reactor by partial oxidation. An oxygen/biological raw material proportion of ingredients and a gas phase temperature are maintained which ensure a combustible gas virtually free of nitrogen oxides. After removing suspended matter from the combustible gas in a separator, the combustible gas is converted into electric energy in fuel cells having a porous anode, a porous cathode and a suitable electrolyte.

18 Claims, 3 Drawing Sheets

METHOD OF GENERATING ELECTRIC ENERGY FROM BIOLOGICAL RAW MATERIALS

This is a continuation of application Ser. No. 08/295,356 filed 24 Aug. 1994, now abandoned, which is a continuation of application Ser. No. 08/029,797 filed on 10 Mar. 1993, now abandoned.

FIELD OF THE INVENTION

My present invention relates to a method of generating electric energy from biological raw materials and, more particularly, to a method involving gasification of the raw material and fuel/cell utilization of gas.

BACKGROUND OF THE INVENTION

"Biological Raw Materials" generally refer to so-called regenerative raw materials, i.e. raw materials which are biologically recoverable with a production rate that approximately corresponds with the consumption rate as opposed to fossil raw materials where the formation of which takes considerably more time than their consumption.

A biological raw material may, for instance, be supplied as a fine powder with a substantially still undamaged cell structure or with disintegrated structure. Biological raw materials can also be obtained as so-called biological organic waste. Biological raw materials substantially contain the elements carbon, hydrogen, oxygen and nitrogen.

Directly converting hydrogen into electric energy by means of fuel cells is well known. As compared with thermal heat engines, fuel cells offer the advantage of not being subjected to the principal thermodynamic restrictions of the efficiency resulting from the Carnot cycle. Fuel cells are theoretically able to convert combustion heat from the reaction of hydrogen with oxygen to water practically completely into electric energy. Therefore, clearly higher efficiency values can be obtained in practice with fuel cells than with thermal heat engines without any particular difficulties. This, however, takes for granted that the catalysts of fuel cells will not be poisoned by catalytic poison which may be contained in the hydrogen gas fed to the fuel cell.

Molecular hydrogen as a raw material is not naturally available but must be extracted from hydrogenous raw materials. Generating hydrogen from water by means of normal electrolysis consumes more current than can be generated with hydrogen, and is for that reason, of course, out of the question. The catalytic separation of water into hydrogen and oxygen is very slow and yields only small quantities with high expenditure of energy, thus offering no advantage for commercial utilization.

Generating so-called synthesis gas which substantially contains hydrogen and carbon monoxide, from coal and the installations required for this generation have been well known for a long time. This process is called coal gasification. The carbon monoxide in the synthesis gas can be converted into hydrogen and carbon dioxide by adding steam at elevated temperatures in a so-called water shift reaction.

Using synthesis gas to operate fuel cells is basically possible, but considerable disadvantages have been obvious in practice. Firstly, coal usually contains sulfur of natural origin which is entrained in the synthesis gas as gaseous sulfur compounds. Sulfer compounds are as a rule high-grade catalytic poisons which may irreversibly deactivate the catalyst of a fuel cell and, thus, the fuel cell itself. Sulfur-containing gases are undesirable emissions as environmental hazards. Secondly, generating synthesis gas from coal is expensive because of the accumulated costs resulting from underground mining, coal gasification and the necessary desulfurization.

OBJECTS OF THE INVENTION

The principal object of the invention is to provide an improved method of generating electric energy which processes cheap raw materials, achieves a high efficiency, operates reliably and permanently, and evidences an especially low emission of harmful substances.

Another object of the invention is to provide an improved method of generating electrical energy whereby the drawbacks of earlier systems are avoided.

SUMMARY OF THE INVENTION

These objects are achieved according to the invention in a method of generating electric energy from biological raw materials wherein:

(a) the biological raw materials used are selected to be substantially free from sulfur of natural origin, (b) a combustible gas is generated which contains carbon monoxide and hydrogen from the biological raw materials with an oxygenous gasification agent (oxygen, atmospheric air or another oxygen-containing agent) by partial oxidation in an oxidation reactor, (c) an oxygen/biological raw material proportion of ingredients and a gas phase temperature are adjusted and maintained which ensure a combustible gas product virtually free from nitrogen oxide in the oxidation reactor, (d) suspended matter is removed from the combustible gas discharged from the oxidation reactor in a separator, and (e) the combustible gas free from suspended matter is converted into electric energy in a fuel cell having a porous anode, a porous cathode and a fused electrolyte consisting of a molten carbonate.

Biological raw materials containing little or no sulfur of natural origin are those which contain quantities of protein.

These are usually plants with substantial cellulose or lignocellulose portions. Sufficiently free from sulfur of natural origin means that the sulfur content is so low that the catalyst of the fuel cell will not be poisoned nor will sulfur be emitted in inadmissible quantities.

If the sulfur content is higher, the biological raw material can be desulfurized by interposing a conventional desulfurization stage in the process.

In an oxidation reactor, the biological raw material is treated with oxygen at a concentration higher than that of the ambient atmosphere and/or atmospheric oxygen and/or steam at an elevated temperature which results in a partial oxidation of the biological raw material into a combustible gas containing hydrogen and carbon monoxide.

The proportion of oxygen and biological raw material, and the gas phase temperature in the oxidation reactor are then selected in such a way that, because of the thermodynamics, for one thing, the oxidation of the biological raw material does not go beyond the reaction product hydrogen or transform the hydrogen to water and, for another thing, the nitrogen of natural origin and/or the atmospheric nitrogen is not oxidized into nitrogen oxides in the oxidation reactor.

When steam is used in the gasification agent, the combustible gas may contain carbon dioxide aside from carbon monoxide. It is a matter of course that the deviations from the thermal equilibrium occurring in continuous operation are to be taken into consideration in the manner known in materials processing, when dimensioning the ingredients, the proportion of oxygen and raw material and the gas phase temperature.

Suspended matter means particles the size and density of which permits them to be entrained in a combustible gas stream. Suspended matter may originate from nonburned raw materials but may also be ash particles.

The anode refers to the positively catalytically active electrode of the fuel cell over which the combustible gas passes and is oxidized with electron emission. The cathode refers to the positively catalytically active electrode or fuel cell over which a combustion agent passes and is reduced with electron take up. The combustion agent must contain carbon dioxide for conversion into oxygen and carbonate ions at the cathode. Porous refers to an electrode structure which, on the one hand, ensures a contact of all three phases (combustible gas or combustion agent, electrode or catalyst and electrolyte), but, on the other hand, prevents the electrolyte from flooding into a combustible gas compartment or combustion agent gas compartment, for instance by the action of capillary forces. Therefore, the term "porous" also includes grid structures having suitable mesh widths.

The invention is based on the knowledge that a combustible gas resulting from partial oxidation of biological raw materials can be converted into electric energy in fuel cells with especially high efficiency, provided that the process for generating the combustible gas will be adapted just to this purpose of the combustible gas.

The use of raw materials which are sufficiently free of sulfur of natural origin ensures without any other measures that, on the one hand, the fuel cells can be operated permanently and reliably without poisoning the catalysts and that, on the other hand, the entire process does not release any disturbing sulfurous emissions.

The adaptation of the oxidation reactor's operating parameters to the relatively high nitrogen content of biological raw materials guarantees that in effect no disturbing nitrogen oxides will be released despite the high nitrogen portion. Nitrogen oxides just as sulfurous emissions are undesirable for environmental protection reasons.

Removing suspended matter, which may increasingly accumulate during the partial oxidation of raw materials, from the combustible gas ensures, on the one hand, that the pores of fuel cell electrodes cannot be clogged to an interfering degree with the result of reduced specific surfaces and thus decreased current density and, on the other hand, the troublefree run of the entire process without any particle emission.

Suspended matter may be separated by using conventional means, for instance by a cyclone filter.

Fuel cells having an electrolyte made of a carbonate melt are characterized by a particularly high efficiency and a high specific performance because of the comparatively high operating temperature. Another advantage of this type of fuel cell in combination with conversion of combustible gas from raw materials into electric energy is the fact that carbon monoxide not only does not interfere with the catalysis, but is even processed for generating electric energy just like hydrogen. Carbon monoxide and carbonate ions react at the anode with electron emission to carbon dioxide.

The combination of the features of the invention achieves a considerable synergistic effect, namely generating electric energy from very cheap and regenerative raw material with a particularly high efficiency and high reliability, with virtually no emission of sulfur compounds, nitrogen oxides and particles.

End products of the method according to the invention are appreciably harmless water and, in conventional generation of electric energy, unavoidable carbon dioxide. Heat is additionally generated and may be recuperated for use in the process especially with application of the allothermal method.

Methods for thermal partial oxidation of biological raw materials into a service gas are in principle known. As yet no operation with direct conversion into electric energy or any special measures required for such operation are known.

In a preferred embodiment of the method according to the invention, the carbonate melt is substantially compounded from alkali metal carbonates and alkali metal aluminates, and the carbonate melt has pasty (viscous) flow properties at the operating temperature of the fuel cell.

Alkali metal carbonates in melted condition provide excellent ion conductivity and melting temperatures which are comparatively low. The melting temperature of an eutectic mixture consisting of lithium, sodium and potassium carbonates is especially low.

Adding alkali aluminates has two effects: to begin with, a pasty composition can be produced at the operating temperature of the fuel cell since powder from alkali metal aluminates will not be melted. An electrolyte having a pasty consistency permits keeping the requirements to be met by the pore structure of the electrodes relatively low without endangering the electrolyte retention. Secondly, alkali metal aluminates act probably as carbon dioxide buffers.

In an especially advantageous and environmentally acceptable embodiment of the method according to the invention, carbon dioxide is extracted from the combustible waste gas escaping on the anode side in a recycler and added to the combustion agent flowing to the cathode side.

A fuel cell with an electrolyte consisting of carbonate melt develops, on the anode side, carbon dioxide from oxidation of hydrogen as well as from oxidation of carbon monoxide. On the other hand, carbon dioxide is required in the combustion agent on the cathode side in order to permit generating carbonate ions. If, for instance, the combustion agent is to be compounded with air, addition of carbon dioxide is required. The carbon dioxide required can be processed by recycling the carbon dioxide produced from the combustible waste gas. A carbon dioxide cycle neutral to the environment involving regenerative biological raw materials, especially $C_4$ plants, can be arranged.

A method for generating electric energy from biological raw materials, independently of the previously described combination of steps, can be characterized by the following:

(a) use of biological raw materials which are sufficiently free of sulfur of natural origin;

(b) generating a combustible gas containing carbon monoxide and hydrogen from biological raw materials with an oxygen-containing gasification agent by partial oxidation in an oxidation reactor;

(c) adjusting and maintaining an oxygen/biological raw material proportion of ingredients and a gas phase temperature which ensure a combustible gas virtually free of nitrogen oxide in the oxidation reactor;

(d) removing suspended matter from the combustible gas extracted form the oxidation reactor in a separator; and (e) converting the combustible gas now free of suspended matter into electric energy in fuel cells having a porous anode, a porous cathode and an acidic electrolyte.

This method provides substantially all properties and advantages of the method which uses an electrolyte consisting of a carbonate melt. The difference from the latter, however, is that the fuel cell can be operated at a comparatively low temperature. Altogether, the efficiency with an acidic electrolyte is somewhat lower as compared with an electrolyte consisting of a carbonate melt, but this is compensated by the better controllability of eventual electrode corrosion effects because of the comparatively low operating temperature.

In this respect, special reliability is achieved because, for instance, sintering of the supporting frame of the electrode pore structures is avoidable. Sulfuric acid or phosphoric acid are preferred as electrolytes. Both acids, especially phosphoric acid, have a relatively high boiling point with only small water additions, thus enabling operation of the fuel cells at high temperatures, e.g. 160° C.

However, the operating temperature of fuel cells with acidic electrolytes is altogether still so low that a special catalytic activity of the electrodes can assist in the conversion of the combustible gas into electric energy.

Compounds or alloys of gold and platinum can form the catalysts. Most other metals cannot resist corrosive attacks of sulfuric acid and especially of phosphoric acid. The catalytic activity of platinum as a rule exceeds the catalytic activity of gold. Platinum catalysts can be poisoned by carbon monoxide.

In a preferred embodiment of the method according to the invention, the combustible gas is, for this reason, treated with acidic electrolytes in a water shift reactor by adding steam and heat in order to convert carbon monoxide into hydrogen and carbon dioxide. This also ensures the optimum utilization of the gross calorific value of combustible gas.

In another embodiment of the method with acidic electrolytes according to the invention, the fuel cell is operated at a temperature >130° C. using a platinum-rhodium catalyst. Specific carbon monoxide quantities in the combustible gas can be tolerated under these conditions. In another embodiment form of the method with acidic electrolytes according to the invention, the fuel cell is operated at a temperature <130° C. using a platinum catalyst with molybdenum or tungsten oxides. This embodiment is also characterized by tolerating carbon monoxide in the combustible gas.

In the methods according to the invention, $C_4$ plants are advantageously used as biological raw materials. Typical for this genus are perennial the $C_4$ reed plants. The $C_4$ plants can be grown fast and inexpensively with virtually no sulfur present.

As far as the partial oxidation in the oxidation reactor is concerned, the method according to this aspect of the invention can operate in various embodiments.

In one embodiment, to which a particular importance is to be attributed, partial oxidation is realized with the supply of externally generated heat and a gasification agent substantially containing steam. This method is an allothermal gasification method. Allothermal gasification requires the supply of externally generated heat since the reaction of biological raw material with steam into combustible gas is altogether endothermal. The heat for partial oxidation can thereby preferably be generated by combusting biological raw material or by combustible gas. The heat for partial oxidation will advantageously be supplied to the oxidation reactor by means of a normal heat transfer gas through a heat exchanger.

In another embodiment of the method according to the invention, the partial oxidation is carried out without the supply of externally generated heat with a gasification agent which substantially contains steam and molecular oxygen or air. This method is an autothermal gasification. Thereby, exothermal oxidation reactions occur with the molecular oxygen portion in the gasification agent which generate "in situ" the heat required for the endothermal reaction of steam and biological raw material.

An autothermal or allothermal gasification is in principle known from the technical journal "Stahl und Eisen", volume 110, 1990, No. 8, pages 131 to 138, but in another context. The so-far known autothermal or allothermal gasification relates to the generation of a service gas from coal, and the literature mentioned does not give any indication as to how a combustible gas can be autothermally or allothermally generated from biological raw materials as this term is used here.

Another aspect of the invention is a method for generating electric energy from biological raw materials wherein the combination of the following features is realized:

(a) use of biological raw materials which are sufficiently free of sulfur of natural origin;

(b) generating a combustible gas containing carbon dioxide and hydrogen from biological raw materials with an oxygenous gasification agent by partial oxidation in an oxidation reactor;

(c) adjusting and maintaining an oxygen/biological raw material proportion of ingredients and a gas phase temperature which ensure a combustible gas virtually free of nitrogen oxide in the oxidation reactor;

(d) removing suspended matter from the combustible gas extracted from the oxidation reactor in a separator; and (e) converting the combustible gas now free of suspended matter into electric energy in fuel cells having a porous anode, a porous cathode and a solid electrolyte whereby the fuel cells are operated at a minimum of 800° C.

This combination of features too permits generation of combustible gas autothermally or allothermally.

Due to the exceptionally high operating temperature of fuel cells having a solid electrolyte made of a metal oxide, the catalytic effect of electrodes is not only nonessential but very high reaction rates of the combustible gas are provided on the anode and of a combustion agent on the cathode since the thermal energy of gases substantially exceeds the activating energy of the heterogeneous dissociation reactions.

High reaction rates permit high specific electrical powers of fuel cells.

In a preferred embodiment of the invention, fuel cells are, therefore, operated at a minimum of 1000° C. (min. 1000° C.), and preferably at min. 1200° C. Operating temperatures within this range may be obtained without any difficulties provided that the thermal expansion coefficients of the anode, cathode and electrolyte materials can be matched or adapted to each other in the usual way. This, of course requires selection of materials of anode and cathode which are sufficiently corrosion-resistant.

High ion conductivity of electrolytes is achievable by using a mixture of zirconium oxide and calcium oxide or a mixture of zirconium oxide and yttrium oxide for the electrolyte. High ion conductivity together with high reaction rates on electrodes ensure a particularly high performance of fuel cells. In further formation, a ceramic metal, preferably of zirconium oxides with nickel or cobalt will be used here advantageously as anode material, and $LaNiO_3$ or doped indium oxide as cathode material.

In order to reduce carbon monoxide, which can possibly be disturbing in combustible gas, the latter can be treated in a water-shift reactor with supply of steam and heat for converting carbon monoxide into hydrogen and carbon dioxide.

A possibly disturbing hydrocarbon content of the combustion gas can be reduced by conducting the combustible gas immediately before conversion into electric energy through a reformer having a catalyst, preferably a transition metal catalyst, and most preferred a nickel catalyst, whereby the catalyst is operated at the same temperature level as the fuel cell.

Exceptionally high fuel cell performances are obtained by using fuel cells, the cathode, electrolyte and anode of which are deposited in a thin-film mode in layers onto a porous, inert backing. Due to the minor layer thickness of the electrolyte, the inside resistance of fuel cells is very low. It is understood that the porosity of the backing is an open porosity in order to permit gas supply to the directly-attached electrode.

Fuel cells having electrolytes of a metal oxide are known as such in the art but are almost exclusively used in aerospace operations, whereby hydrogen carried along acts as combustible gas, the hydrogen having been previously produced and stored by conventional means.

The $C_4$ plants are advantageously also used as biological raw materials with this aspect of the invention. Typically representative are perennial $C_4$ reed plants. The $C_4$ plants can be grown rapidly with minor costs and virtually no presence of sulfur.

Concerning partial oxidation in the oxidation reactor, the method according to the invention functions in various embodiment forms. In one embodiment, partial oxidation is carried out with a supply of externally-generated heat and a gasification agent substantially containing steam. This method is, as noted, an allothermal gasification. Thereby the heat required for partial oxidation can be generated preferably by combustion of biological raw material or by combustible gas. The heat for partial oxidation is advantageously supplied to the oxidation reactor by means of a normal heat transfer gas through a heat exchanger.

In another embodiment of the method according to the invention, the partial oxidation is performed without supply of externally generated heat by means of a gasification agent substantially containing steam and molecular oxygen or air respectively in an autothermal gasification as previously described. Thereby exothermal oxidation reactions occur with the molecular oxygen portion in the gasification agent which generate "in situ" the heat required for endothermal reaction of steam and biological raw material.

In another embodiment of the method according to this aspect of the invention, the partial oxidation of biological raw materials in the oxidation reactor is carried out thermally, e.g. by means of air as gasification agent. Air as gasification agent may be used without any difficulties provided that the thermodynamical requirements concerning the oxygen to biological raw material proportion of ingredients are met. Air is always available and cheap.

BRIEF DESCRIPTION OF THE DRAWING

The above and other objects, features, and advantages will become more readily apparent from the following, reference being made to the accompanying drawing in which.

SPECIFIC DESCRIPTION AND EXAMPLES

Figure 1:
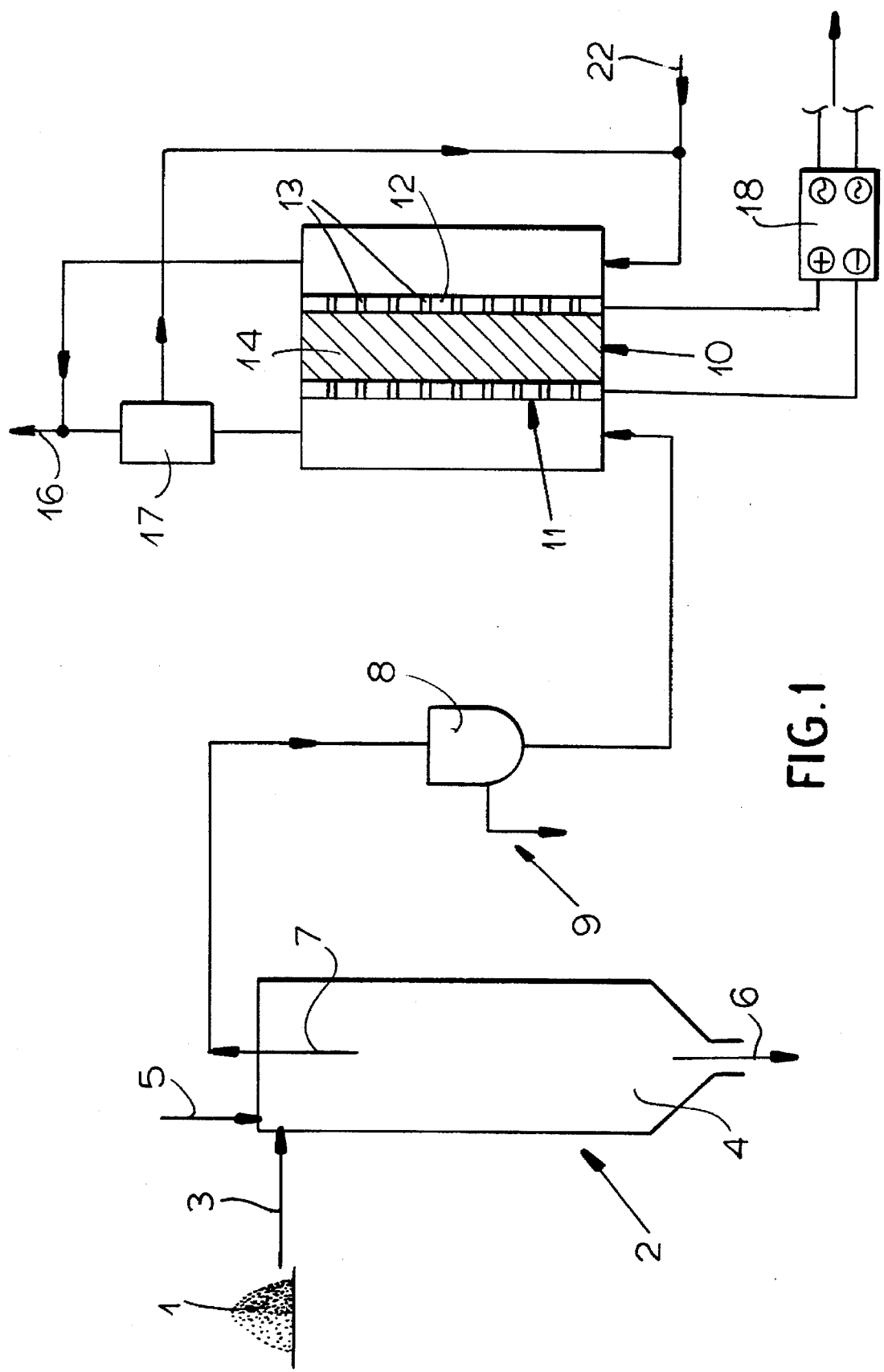
FIG. 1 is a flow diagram of an installation for carrying out the method according to the invention with an electrolyte consisting of a carbonate melt.

According to FIG. 1, a dissected (comminuted) and dried biological raw material 1 is made of plants, especially of $C_4$ plants. The biological raw material 1 is delivered into a reaction space 4 of an oxidation reactor 2 through a pipe 3. Air 5 is supplied as gasification agent from a gasification agent supply means.

Oxidation of biological raw material in the reaction space 4 of oxidation reactor 2 is controlled or regulated respectively by means of the air supplied and a heat supply so that only a partial oxidation of biological raw material 1 into hydrogen and carbon monoxide takes place, and practically no nitrogen oxides are generated. To achieve this, conventional sensors and actuators (not shown) can be adapted.

Partially or completely oxidized, solid biological raw material 1 is taken from ash discharge line 6.

Hydrogen and carbon monoxide are drawn from combustion gas collecting line 7 as combustible gas and supplied to separator 8.

In separator 8 suspended matter is removed from combustible gas, and separately discharged through suspended matter collecting line 9.

The combustible gas now free of suspended matter is then delivered to an anode 11 in a fuel cell 10. Air derived from air supply means 22 is first enriched with carbon dioxide and then supplied to a cathode 12 of fuel cell 10 as a combustion agent.

An electrolyte 14 consisting of a mixture of alkali metal carbonates and alkali metal aluminates is enclosed between anode 11 and cathode 12, and maintained at a temperature of approx. 650° C. Anode 11 and cathode 12 have open pores 13 which enable electrolyte 14 to contact combustible gas and combustion agent respectively, but safely enclose the pastous electrolyte.

Carbon monoxide and oxygen react with absorption of electrons from the cathode at cathode 12 into carbonate ions which are dissolved in the electrolyte. The carbonate ions migrate to anode 11 and react with hydrogen of the combustible gas into water and carbon dioxide, and with the carbon monoxide of the combustible gas into carbon dioxide with electron emission to anode 11.

The direct voltage generated between negative anode 11 and positive cathode 12 is led to a power inverter and voltage transformer 18, and transformed into a normal mains voltage.

A carbon dioxide recycler 17 feeds the combustible waste gas generated at the anode side to an exhaust 16. At the same time, carbon dioxide is extracted from combustible waste gas in carbon dioxide recycler 17. The combustible waste gas generated at the cathode side is delivered directly to exhaust 16.

Figure 2:
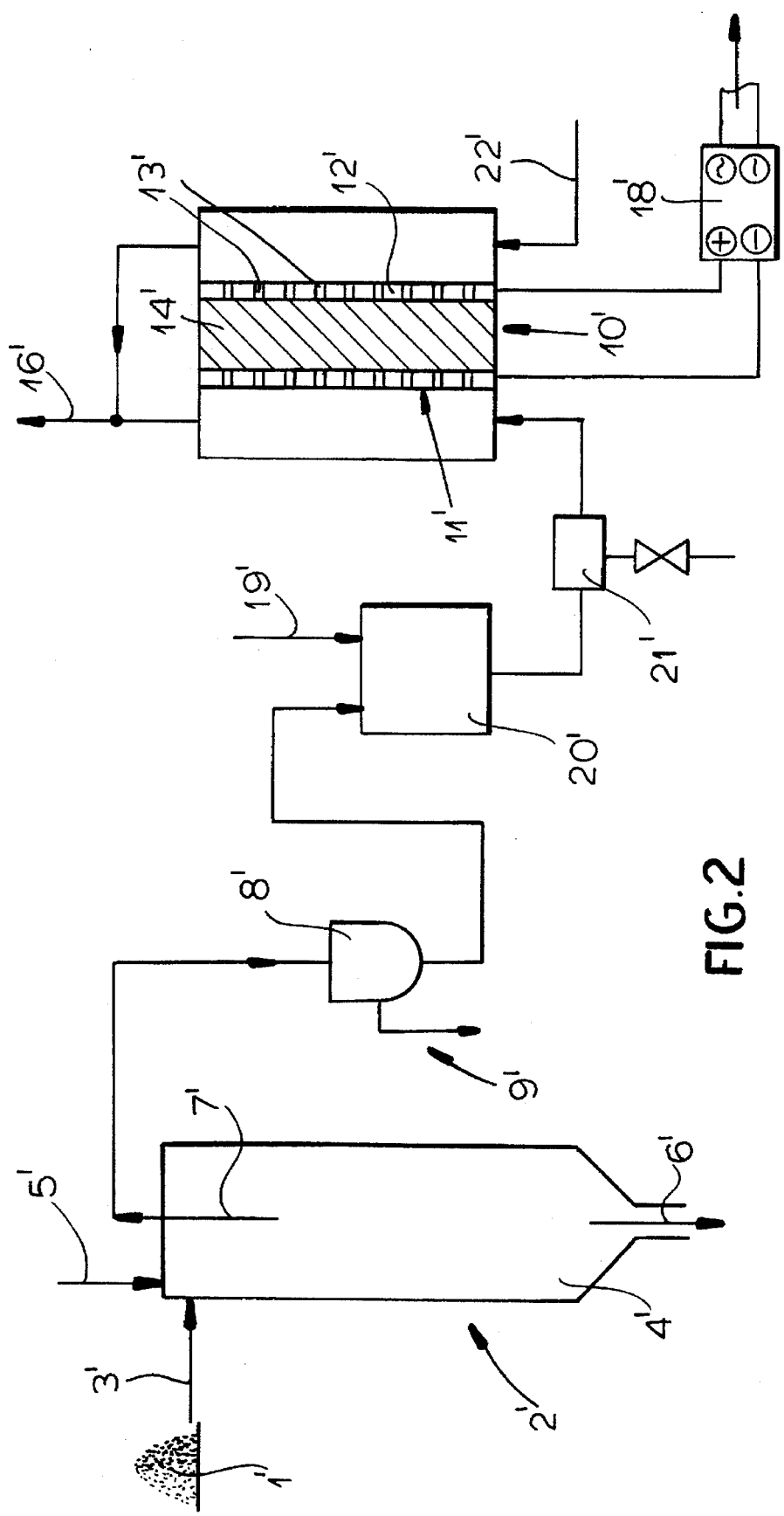
FIG. 2 is a diagram of an installation for the method according to the invention with an electrolyte containing phosphoric acid.

In the method according to FIG. 2, the biological raw material 1 is converted into combustible gas and freed of suspended matter according to FIG. 1, and reference can be made, therefore, to the description associated with FIG. 1. Reference units having the same number in both Figures correspond with each other.

The further method using an acidic electrolyte will now be described in detail:

At first the combustible gas freed of suspended matter is supplied to a water shift reactor 20', to which an addition steam in sufficient quantity from a superheated steam source 19' is supplied at the temperature required so that carbon monoxide of the combustible gas is converted into hydrogen and carbon monoxide in a water shift reaction.

A combustible gas with hydrogen and carbon dioxide as main constituents is generated from which excess steam and/or water resulting from the water shift reaction is removed in a water separator 21'. The combustible gas so treated and freed of water is then supplied to an anode 11' of a fuel cell 10'.

Air is taken from air supply means 22' and as combustible agent supplied to a cathode 12' of fuel cell 10'. An electrolyte 14' of phosphorous acid with approx. 10% water maintained at a temperature of approx. 150° C. is enclosed between anode 11' and cathode 12'. Anode 11' and cathode 12' have open pores 13' which enable electrolyte 14' to contact combustible gas and combustion agent respectively, but securely enclose electrolyte 14' due to suitably matched surface tensions.

At anode 11', hydrogen of combustible gas is dissolved as protons in electrolyte 14' with emission of electrons to anode 11'. The protons migrate to cathode 12' and react with oxygen of the combustion agent to water with absorption of electrons from cathode 12'.

Anode 11' and cathode 12' have a catalytically-active platinum surface. Rhodium is additionally alloyed to platinum at least at anode 11'.

The direct voltage produced between negative anode 11' and positive cathode 12' is led to a power inverter and voltage transformer 18, and transformed into normal mains voltage.

The combustible waste gas escaping from the anode side, which virtually contains nothing but carbon dioxide from the water shift reaction as well as the combustion agent waste gas escaping form the cathode side, containing only water aside from air constituents, can be blown out through an exhaust 16' without any difficulties.

Material balances of the partial oxidation of the biological raw materials into combustible gas of an embodiment example of the invention with allothermal gasification are given as follows:

One biological raw material is used at a time and contains 29.4 mol % carbon, 48.3 mol % hydrogen, 21.9 mol % oxygen, 3.0 mol % nitrogen and 0.3 mol % sulfur.

The allothermal gasification always takes place at 750° C. but at different pressures, namely at 40 bar, at 10 bar nd at 2 bar.

The allothermal gasification at 40 bar resulted in a combustible gas with 47 percent by volume hydrogen, 11.6 percent by volume carbon monoxide, 28.3 percent by volume carbon dioxide and 12.7% methane. The net gas quantity amounted to 1.27 m$^3$/kg biological raw material (normal pressure).

The allothermal gasification at 10 bar resulted in a combustible gas with 57.6 percent by volume hydrogen, 15.8 percent by volume carbon monoxide, 22.8 percent by volume carbon dioxide and 3.6 percent by volume methane. The net gas quantity amounted to 1.67 m$^3$/kg biological raw material (normal pressure).

The allothermal gasification at 2 bar resulted in a combustible gas with 61.4 percent by volume hydrogen, 17.6 percent by volume carbon monoxide, 20.7 percent by volume carbon dioxide and 0.3 percent by volume methane. The net gas quantity amounted to 1.84 m$^3$/kg biological raw material (normal pressure).

The gas analyses were conducted in thermal equilibrium. In all cases, the combustible gas was virtually free of nitrogen oxides. Sulfur oxides could be detected only in minor quantities which did not influence the performance of the fuel cell even in prolonged operation. To operate a fuel cell with an electrolyte containing phosphoric acid, a comparatively simple water shift reactor was required with allothermal gasification, since the combustible gas escaping form the oxidation reactor already contained relatively little carbon monoxide and relatively much carbon dioxide. Probably the water shift reactor may be dispensed with entirely in the embodiment form of the invention with allothermal gasification and electrolyte containing phosphoric acid. It is understood that heat released within the scope of the invention can be suitably regenerated in the method according to the invention.

Figure 3:
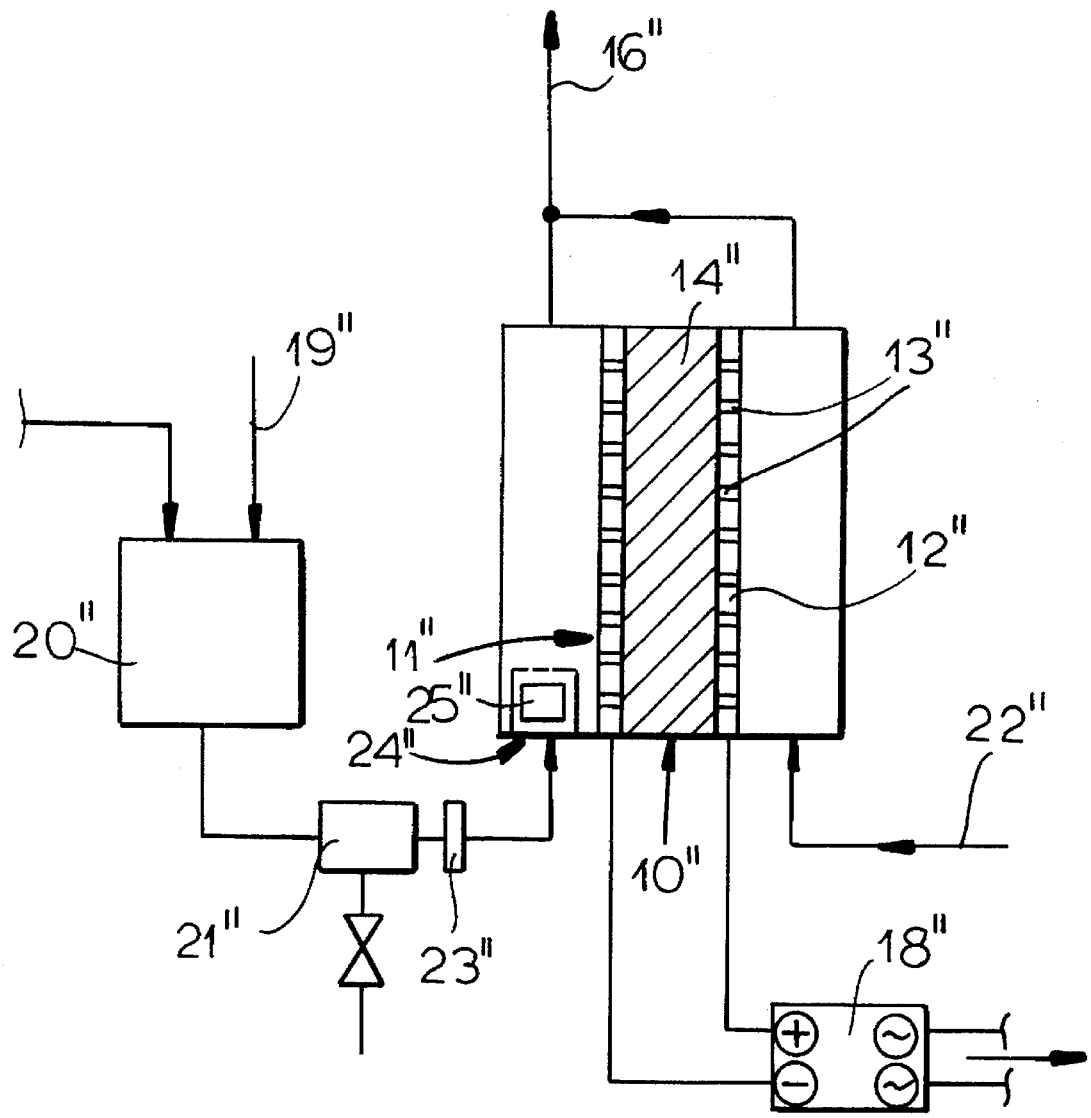
FIG. 3 is a diagram of an installation for the method according to the invention with a "solid oxide" fuel cell.

In the embodiment shown in FIG. 3, the gasification functions as described with reference to FIGS. 1 and 2.

The combustible gas freed of suspended matter in the already described manner is then supplied to a water shift reactor 20" to which in addition steam from a superheated steam source 19" at the temperature required is delivered in sufficient quantity.

A combustible gas with hydrogen and carbon dioxide as main constituents is generated from which excess steam and/or water resulting from the water shift reaction is removed in a water separator 21". The combustible gas thus treated and freed of water is at first conducted through a conventional carbon dioxide separator 23" and then through a reformer 24" having a nickel catalyst 25".

Since the reformer 24" is structurally combined with the fuel cell 10", the temperature of catalyst 25" is in effect equal to the temperature of fuel cell 10", i.e. approx. 1000° C. The combustible gas streaming out of reformer 24" and freed of carbon residues streams then over anode 11" of fuel cell 10".

Air is taken from supply means 22" and fed to fuel cell 10" as a combustion agent for cathode 12".

Anode 11' may for instance consist of a ceramic metal with zirconium oxides and cobalt. The LaNiO$_3$ may be used as cathode material. Zirconium oxide and yttrium oxide are present in electrolyte 14" in the embodiment example. Anode 11" and cathode 12" have perforations 13" as pores enabling electrolyte 14" to contact combustible gas and combustion agent respectively. Hydrogen of combustible gas is burned to water at anode 11" under reaction of oxygen ions from electrolyte 14".

The oxygen ions are obtained from the combustion agent at cathode 12" and transported by electrolyte 14" to the anode. The direct voltage applied between negative anode 11" and positive cathode 12" is led to an inverter and voltage transformer 18" and converted into normal mains voltage. The combustible waste gas escaping from the anode side contains in effect only water, and the combustion agent waste gas escaping from the cathode side essentially contains nitrogen. Both can be blown off through an exhaust 16" without any difficulties.

I claim:

1. A method of generating electrical energy from biological raw materials, comprising the steps of:

(a) comminuting biological raw materials consisting of at least predominantly of C$_4$ reed plants substantially free from naturally occurring sulfur;

(b) generating a combustible gas containing carbon monoxide and hydrogen from said biological raw materials with an oxygenous gasification agent by partial oxidation of said raw materials performed with a supply of externally generated heat in an oxidation reactor;

(c) adjusting and maintaining an oxygen/biological raw materials proportion of ingredients and a gas phase temperature which ensures production of a combustible gas virtually free of nitrogen oxide in the oxidation reactor;

(d) discharging said combustible gas from said oxidation reactor;

(e) removing suspended matter from the combustible gas discharged from the oxidation reactor in a separator; and (f) converting the combustible gas discharged from said oxidation reactor and free from suspended matter into electrical energy in a fuel cell having a porous anode, a porous cathode and an electrolyte consisting of a carbonate melt, the carbonate melt being constituted substantially of alkali metal carbonates and alkali metal aluminates, and the carbonate melt having a pasty flow property at an operating temperature of the fuel cell, the fuel cell being operated at a temperature >130° C., a platinum/rhodium catalyst or a platinum catalyst with molybdenum or tungsten oxide being used in at least one electrode of said fuel cell, carbon dioxide being extracted in a recycler from a combustible waste gas discharged at an anode side of said fuel cell and is supplied to said fuel cell as a combustion agent to a cathode side of said fuel cell.

2. A method of generating electrical energy from a biological raw material comprising the steps of:

(a) comminuting a biological raw material consisting at least predominantly of $C_4$ reed plants substantially free from naturally occurring sulfur;

(b) generating a combustible gas containing carbon monoxide and hydrogen from the biological raw material with an oxygenous gasification agent by partial oxidation of the raw material performed with a supply of externally generated heat in an oxidation reactor;

(c) adjusting and maintaining an oxygen/biological raw materials proportion of ingredients and a gas phase temperature which ensures a combustible gas virtually free of nitrogen oxide in the oxidation reactor;

(d) removing suspended matter from the combustible gas extracted from the oxidation reactor in a separator; and (e) converting the combustible gas free from suspended matter into electrical energy in a fuel cell having a porous anode, a porous cathode and an acidic electrolyte, the fuel cell being operated at a temperature >130° C., a platinum/rhodium catalyst or a platinum catalyst with molybdenum or tungsten oxide being used in at least one electrode of said fuel cell.

3. The method defined in claim 2 wherein said electrolyte contains sulfuric acid.

4. The method defined in claim 2 wherein said electrolyte contains phosphoric acid.

5. The method define in claim 2 wherein the externally generated heat required for partial oxidation is supplied by a gasification agent substantially containing steam.

6. The method defined in claim 2 wherein the externally generated heat for the partial oxidation is generated by externally combusting biological raw material.

7. The method defined in claim 2 wherein the externally generated heat for the partial oxidation is generated by burning a combustible gas.

8. The method defined in claim 2 wherein the externally generated heat for the partial oxidation is supplied to the oxidation reactor by heat transfer gas through a heat exchanger.

9. A method of generating electrical energy from a biological raw material comprising the steps of:

(a) comminuting a biological raw material consisting at least predominantly of $C_4$ reed plants substantially free from naturally occurring sulfur;

(b) generating a combustible gas containing carbon monoxide and hydrogen from said biological raw material with an oxygenous gasification agent by partial oxidation of the raw material performed with a supply of externally generated heat in an oxidation reactor;

(c) adjusting and maintaining an oxygen/biological raw material proportion of ingredients and a gas phase temperature which ensures a combustible gas virtually free of nitrogen oxide in the oxidation reactor;

(d) removing suspended matter from the combustible gas extracted from the oxidation reactor in a separator; and (e) converting the combustible gas free from suspended matter into electrical energy in a fuel cell having a porous anode, a porous cathode and an electrolyte consisting of a metal oxide, wherein the fuel cells are operated at a temperature of a minimum of 800° C., the combustible gas being conducted immediately before converting into electrical energy through a reformer with a catalyst of a transition metal and operated at the same temperature as the fuel cell, said fuel cell having its cathode, electrolyte and anode applied in layers onto a porous, inert backing in thin films.

10. The method defined in claim 9 wherein the fuel cell is operated at a temperature of at least 1000° C.

11. The method defined in claim 9 wherein a mixture of zirconium oxide and calcium oxide or of zirconium oxide and yttrium oxide is used as the electrolyte.

12. The method defined in claim 9 wherein a ceramic metal oxide with nickel or cobalt is used as the anode.

13. The method defined in claim 9 wherein $LaNiO_3$ or indium oxide is used as the cathode.

14. The method defined in claim 9 wherein the combustible gas is treated in a water shift reactor with a supply of steam and heat for converting carbon monoxide into hydrogen and carbon dioxide.

15. The method defined in claim 9 wherein the externally generated heat required for partial oxidation is supplied by a gasification agent substantially containing steam.

16. The method defined in claim 9 wherein the externally generated heat required for partial oxidation is generated by combustion of biological raw material.

17. The method defined in claim 9 wherein the externally generated heat required for partial oxidation is externally generated by combustion of combustible gas.

18. The method defined in claim 9 wherein the externally generated heat for partial oxidation is supplied to the oxidation reactor by means of a heat transfer gas through a heat exchanger.

* * * * *